(12) United States Patent
Yang et al.

(10) Patent No.: US 8,917,073 B2
(45) Date of Patent: Dec. 23, 2014

(54) COT CONVERTER WITH CONTROLLED FREQUENCY AND ASSOCIATED METHOD

(71) Applicant: Monolithic Power Systems, Inc., San Jose, CA (US)

(72) Inventors: Eric Yang, Saratoga, CA (US); Qian Ouyang, Hangzhou (CN); Bo Zhang, Hangzhou (CN); Lijie Jiang, Hangzhou (CN); Xiaokang Wu, Hangzhou (CN); Suhua Luo, Hangzhou (CN)

(73) Assignee: Monolithic Power Systems, Inc., San Jose, CA (US)

( * ) Notice: Subject to any disclaimer, the term of this patent is extended or adjusted under 35 U.S.C. 154(b) by 71 days.

(21) Appl. No.: 13/668,163

(22) Filed: Nov. 2, 2012

(65) Prior Publication Data

US 2014/0125302 A1  May 8, 2014

(51) Int. Cl.
*G05F 1/00* (2006.01)
(52) U.S. Cl.
USPC .......................................................... 323/283
(58) Field of Classification Search
USPC ............... 323/234, 237, 282–285, 265
See application file for complete search history.

(56) References Cited

U.S. PATENT DOCUMENTS

| | | | |
|---|---|---|---|
| 6,763,114 B1 * | 7/2004 | Nalbant ........................ | 381/120 |
| 2003/0081433 A1 * | 5/2003 | Itakura et al. ................ | 363/21.06 |
| 2006/0038547 A1 * | 2/2006 | Ahmad ........................ | 323/284 |
| 2008/0272751 A1 * | 11/2008 | Allinder et al. ................ | 323/271 |
| 2010/0033154 A1 * | 2/2010 | Cheng et al. ................... | 323/293 |
| 2010/0134080 A1 * | 6/2010 | Ouyang ........................ | 323/282 |
| 2010/0181983 A1 | 7/2010 | Ouyang | |
| 2011/0057632 A1 * | 3/2011 | Cheng et al. ................... | 323/234 |
| 2011/0068759 A1 * | 3/2011 | Kuo ............................... | 323/282 |
| 2012/0146606 A1 | 6/2012 | Li | |
| 2012/0146608 A1 * | 6/2012 | Wan et al. ..................... | 323/284 |
| 2012/0235664 A1 | 9/2012 | Dong | |
| 2013/0107584 A1 * | 5/2013 | Li et al. ....................... | 363/21.12 |

OTHER PUBLICATIONS

U.S. Appl. No. 13/538,815, filed Jun. 29, 2012, Wang.
U.S. Appl. No. 13/538,045, filed Jun. 29, 2012, Xi.

* cited by examiner

*Primary Examiner* — Adolf Berhane
*Assistant Examiner* — Jeffrey Gblende
(74) *Attorney, Agent, or Firm* — Perkins Coie LLP

(57) ABSTRACT

A SMPS having a switch; an output port coupled to a load, configured to provide a voltage feedback signal and a current feedback signal; an on-time generator, having an input end coupled to the current feedback signal, and having an output end providing a time signal indicating a time period; and a PWM generator, having a first input end coupled to the voltage feedback signal, a second input end coupled to the time signal, and an output end providing a PWM signal that is coupled to the control end of the switch, and wherein the PWM signal is configured to turn ON the switch when the voltage feedback signal is lower than a threshold voltage, and the PWM signal is configured to turn OFF the switch after the time period.

13 Claims, 5 Drawing Sheets

US 8,917,073 B2

COT CONVERTER WITH CONTROLLED FREQUENCY AND ASSOCIATED METHOD

TECHNICAL FIELD

The present invention generally relates to power supply, and more particularly but not exclusively relates to constant-on-time (COT) converter.

BACKGROUND

In a COT converter, a switch is turned on once a predetermined condition is detected. The on-state of the switch is maintained for a predetermined time period. At the end of the time period, the switch is turned off. Then the switch waits for a next cycle's turning-on when the predetermined condition is detected again. When the load of the converter increases, after turning off the switch, the output voltage decreases quicker and reaches the predetermined condition quicker, and accordingly, the switching frequency increases. A higher switching frequency leads to higher power loss. FIG. 1 shows a diagram illustrating the relationship between switching frequency and load under continuous conduction mode (CCM) in a COT converter. The switching frequency of the COT converter increases along with increasing load which is indicated by the output current.

Accordingly, an improved method is desired to at least overcome the above mentioned deficiency.

SUMMARY

One embodiment of the present invention discloses a switching mode power supply (SMPS) configured to supply a load. The SMPS comprises: a switch, having a control end; an output port, configured to provide an output voltage, wherein the output voltage is regulated under the switching action of the switch, wherein the output port is coupled to the load, and wherein the output port is further configured to provide a voltage feedback signal indicating the output voltage and a current feedback signal indicating an output current of the load; an on-time generator, having an input end and an output end, wherein the input end is coupled to the current feedback signal, and wherein the output end is configured to provide a time signal indicating a time period; and a pulse width modulation (PWM) generator, having a first input end, a second input end and a first output end, wherein the first input end is coupled to the voltage feedback signal, the second input end is coupled to the time signal, and the output end is configured to provide a PWM signal that is coupled to the control end of the switch, and wherein the PWM signal is configured to turn ON the switch when the voltage feedback signal is lower than a threshold voltage, and the PWM signal is configured to turn OFF the switch after the time period.

BRIEF DESCRIPTION OF THE DRAWINGS

Non-limiting and non-exhaustive embodiments are described with reference to the following drawings. The drawings are only for illustration purpose. Usually, the drawings only show part of the system or circuit of the embodiments.

The use of the same reference label in different drawings indicates the same or like components.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

In a SMPS which adopts COT control, the on time for COT control may be adjusted according to the load, or in other words, according to the output current. The load or output current in a whole range may be divided into multiple levels, and each level corresponds to a particular on time period. And a higher load level corresponds to a longer time period.

Figure 1:
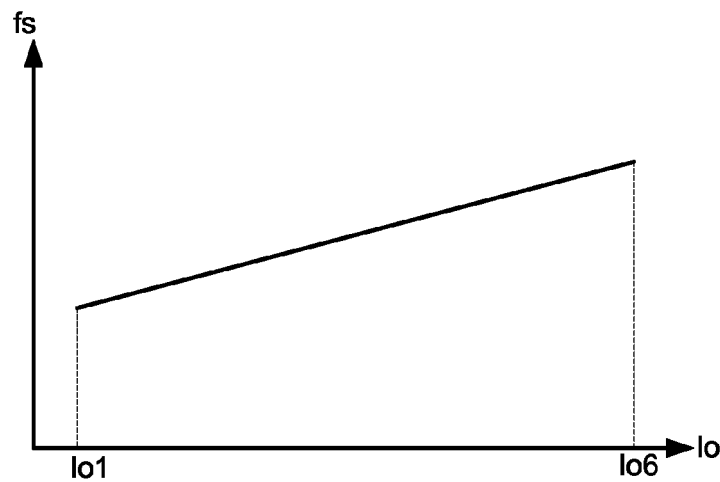
FIG. 1 shows a diagram illustrating the relationship between switching frequency and load under continuous conduction mode (CCM) in a prior art COT converter.
Figure 2:
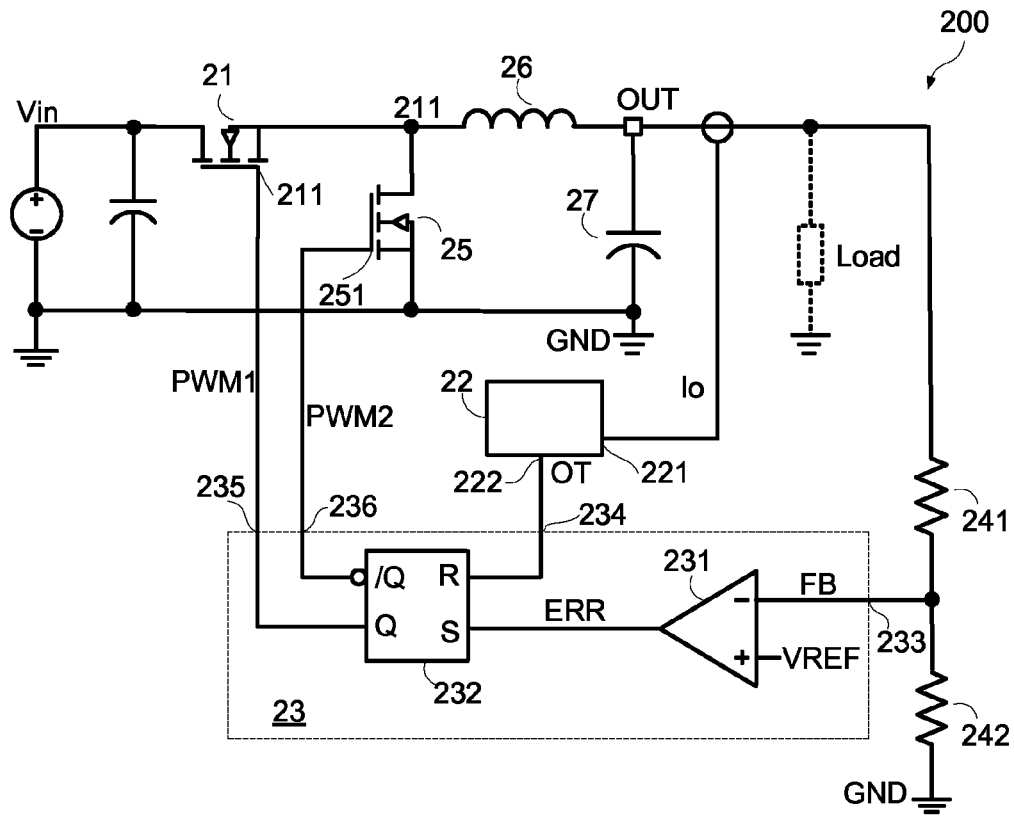
FIG. 2 illustrates a SMPS with COT control, where the switching frequency is adjusted according to different load levels, according to an embodiment of the present invention.
Figure 6:
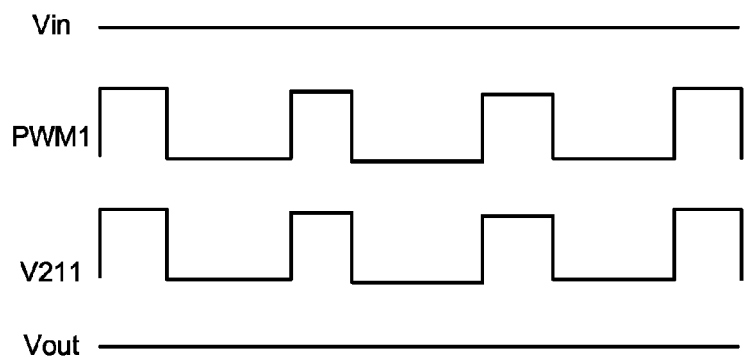
FIG. 6 shows some signals in the SMPS in FIG. 2 according to an embodiment of the present invention.

FIG. 2 illustrates a SMPS 200 with COT control, where the switching frequency is adjusted according to different load levels, according to an embodiment of the present invention. The SMPS comprises a high side switch 21, an output port OUT configured to provide an output voltage, an on-time generator 22, and a PWM generator 23. The SMPS 200 comprises a buck converter which has a switch 21 coupled between an input voltage Vin and a port 211, a rectifier 25 coupled between port 211 and a reference ground GND, an inductor 26 coupled between port 211 and the output port OUT, and an output capacitor 27 coupled between the output port OUT and the reference ground GND. Under the control of signal PWM1 from the PWM generator 23, switch 21 performs switching actions and generates a signal V211 at port 211 as shown in FIG. 6. The shape of signal V211 is similar to signal PWM1. In one embodiment, switch 21 is an N-type metal oxide semiconductor field effect transistor (NMOSFET). And under the filtering of inductor 26 and output capacitor 27, the buck converter generates an output voltage Vout at the output port OUT. When the inductor 26 and output capacitor 27 are ideal ones, the output voltage Vout is a direct-current (DC) signal.

Continuing with FIG. 2, in other embodiments, SMPS 200 may apply other topologies, such as boost converter, buck-boost converter, fly-back converter, and other switching mode power supplies that adopt COT control. Rectifier 25 in FIG. 2 is a synchronous rectifier and the control end of rectifier 25 is controlled by a signal PWM2 from the PWM generator. Usually, signal PWM2 coupled to rectifier 25 and signal PWM1 coupled to switch 21 are in complementary fashion. However, in another embodiment, rectifier 25 may adopt non-synchronous rectifier of a diode, and signal PWM2 is not needed.

Continuing with FIG. 2, the output voltage Vout is regulated under the switching action of switch 21, to be specifically, Vout is regulated by the duty cycle of the control signal PWM1. Duty cycle is the proportion of time during which switch 21 is turned on. During work, the output port OUT is coupled to a load and allows an output current flowing through the load. The output port OUT is further configured to provide a voltage feedback signal FB indicating the output voltage and a current feedback signal Io indicating the output current flowing through the load. The voltage feedback signal FB is obtained by a feedback circuit. In the shown embodiment, the feedback circuit comprises a resistor divider which comprises resistors 241 and 242, and the voltage feedback signal FB is proportional to the output voltage where the proportion is decided by the resistors 241 and 242. In other embodiment, the feedback circuit may have other configuration. On-time generator 22 has an input end 221 and an output end 222. Input end 221 is coupled to the current feedback signal Io. Output end 222 is coupled to PWM generator 23. Output end 222 provides a time signal OT indicating a period of time. And the on time period indicated by signal OT is adjusted according to the current feedback signal Io. In one embodiment, on-time generator 22 further comprises several other input ends coupled to e.g. input voltage Vin, and output voltage, and the on time period indicated by signal OT is further adjusted cycle by cycle by the input voltage Vin and the output voltage at output port OUT. In one embodiment, the current feedback signal in a whole range is divided into multiple levels, and each level corresponds to a particular on time period. And the higher output current/current feedback signal corresponds to a longer on time period. PWM generator 23 has a first input end 233, a second input end 234, a first output end 235 and a second output end 236. The first input end 233 is coupled to the voltage feedback signal FB, the second input end 234 is coupled to the time signal OT, and the output end 235 is configured to provide a PWM signal PWM1 coupled to the control end of switch 21. Wherein signal PWM1 turns HIGH to turn on switch 21 when the voltage feedback signal is lower than a threshold voltage VREF, and signal PWM1 turns LOW after a period of time of Ton once signal OT is set HIGH to turn off switch 21. In another embodiment, the voltage feedback signal FB may increase with decreasing output voltage, and signal PWM1 will turn on switch 21 when the voltage feedback signal is higher than a threshold voltage.

PWM generator 23 internally comprises a comparator 231 and a flip-flop 232. Comparator 231 has an inverting input end coupled to the voltage feedback signal FB, a non-inverting input end coupled to a reference voltage VREF, and an output end providing a comparison signal ST. Comparator 231 compares signal FB with VREF and outputs logic HIGH when feedback signal FB is lower than reference voltage VREF. Flip-flop 232 has a set input end S coupled to signal ST, a reset input end R coupled to output end 222 of on-time generator 22, a first output end Q coupled to the control end 211 of switch 21, and a second output end /Q coupled to the control end 251 of synchronous rectifier 25. SMPS 200 may further comprise a first driver and a second driver. The first driver is coupled between the first output end Q of flip-flop 232 and the control end 211 of switch 21, and the second driver is coupled between the second output end /Q of flip-flop 232 and the control end 251 of synchronous rectifier 25. In one embodiment, SMPS 200 adopts a diode as its rectifier 25, and PWM generator 23 outputs only one PWM signal coupled to the control end 211 of switch 21.

In one embodiment, on-time generator 22 and PWM generator 23 are integrated on a semiconductor substrate as a controller chip.

Figure 3:
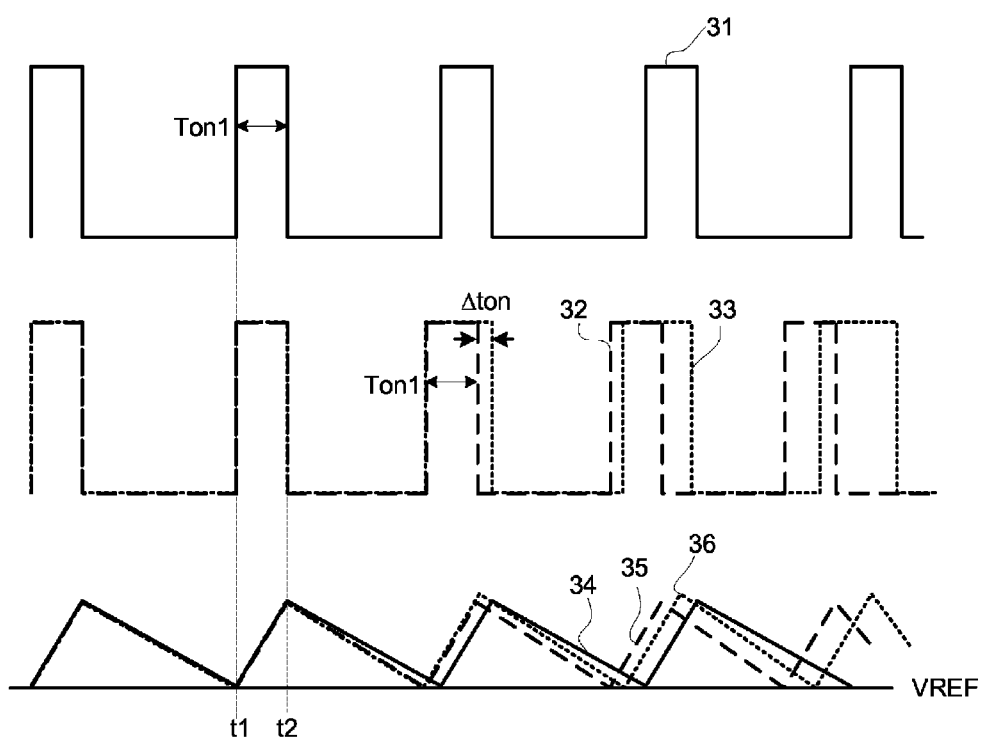
FIG. 3 shows some waveforms to illustrate the method of adjusting switching frequency in a COT converter, according to an embodiment of the present invention.

FIG. 3 shows some waveforms to illustrate the function of a COT control, according to an embodiment of the present invention. Signal 31 illustrates a PWM signal generated according to a traditional COT control during a low steady load condition. Signal 32 illustrates a PWM signal generated according to a traditional COT control during up-transient load condition. Signal 33 illustrates signal PWM1 of SMPS 200 with adjustable on time period of COT control during up-transient load condition, according to an embodiment of the present invention. Signal 34 illustrates the voltage feedback signal FB of output voltage corresponding to PWM signal 31 during continuous current mode (CCM). Signal 35 illustrates the voltage feedback signal FB corresponding to PWM signal 32 during heavy load condition of CCM mode. And signal 36 illustrates the voltage feedback signal FB corresponding to PWM signal 33 under CCM mode. Firstly refers to traditional COT control during steady load condition. During steady load condition, the increasing rate of voltage feedback signal 34 and decreasing rate of voltage feedback signal 34 are constant, and the decreasing rate of signal 34 is low. At time t1, PWM signal 31 is set HIGH, and voltage feedback signal 34 increases. After a time period of Ton1, PWM signal 31 is set LOW and voltage feedback signal 34 decreases. Once voltage feedback signal 34 decreases below the reference signal VREF, PWM signal 31 is set HIGH again. The frequency of PWM signal 31 or switching frequency will keep unchanged during steady load condition if the input voltage is constant. Then referring to a up-transient load condition, after time t2, the load becomes heavier and voltage feedback signal 35 decreases faster, and compared to the steady load condition, PWM signal 32 is triggered HIGH earlier than signal 31. This leads to a higher frequency of PWM signal 32. In order to at least partially eliminate the increasing power loss and low efficiency caused by the high frequency, the on time period of COT control is prolonged. Referring to signal 33, during heavy load condition, the on time period is prolonged by an additional time period $\Delta ton$. A heavier load corresponds to a longer on time. In this way, the frequency of PWM signal 33 is maintained in a range.

Figure 4:
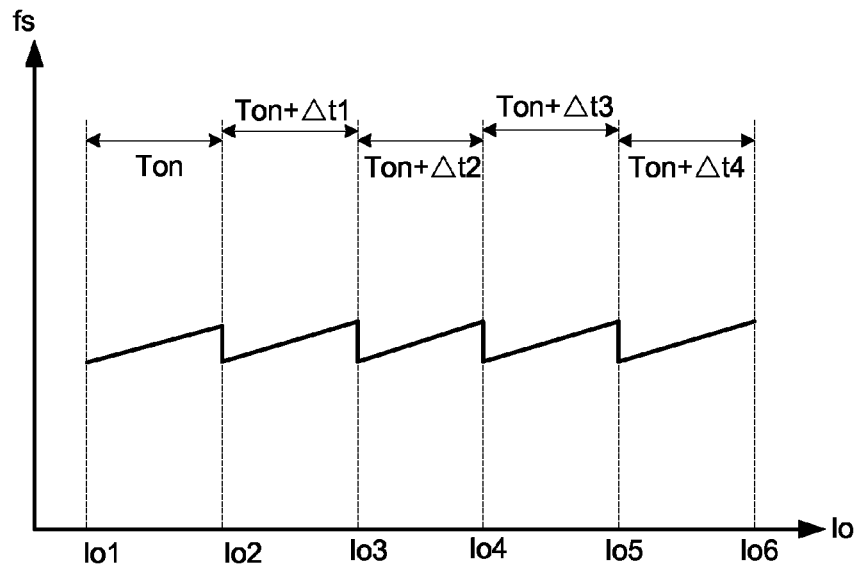
FIG. 4 shows a diagram illustrating the relationship between switching frequency and load under CCM mode in a COT converter, according to an embodiment of the present invention.

FIG. 4 shows a diagram illustrating by scaling the load/output current into multiple levels, and matching each level with an on time period, the frequency is maintained in a predetermined range, according to an embodiment of the present invention. The x-axis represents the output current Io and the y-axis represents the frequency of PWM signal under CCM mode of COT control. In the shown embodiment, between the output current range of Io1 and output current Io6, the output current is divided into five levels: a first level from Io1 to Io2, a second level from Io2 to Io3, a third level from Io3 to Io4, a fourth level from Io4 to Io5, and a fifth level from Io5 to Io6. During the first level, the on time period is set as Ton. During the second level, the on time period is set as Ton+$\Delta t1$. During the third level, the on time period is set as Ton+$\Delta t2$. During the fourth level, the on time period is set as Ton+$\Delta t3$. And during the fifth level, the on time period is set as Ton+$\Delta t4$, where $\Delta t4 > \Delta t3 > \Delta t2 > \Delta t1$. In one embodiment, Δt2=2*Δt1, Δt3=3*Δt1, and Δt4=4*Δt1. By properly setting the values of Δt1, Δt2, Δt3 and Δt4, the frequency fs of the PWM signal under CCM mode in a COT converter is limited in a predetermined range. In the shown embodiment, switching frequency fs presents a saw-tooth shape based on the variation of output current Io.

Figure 5:
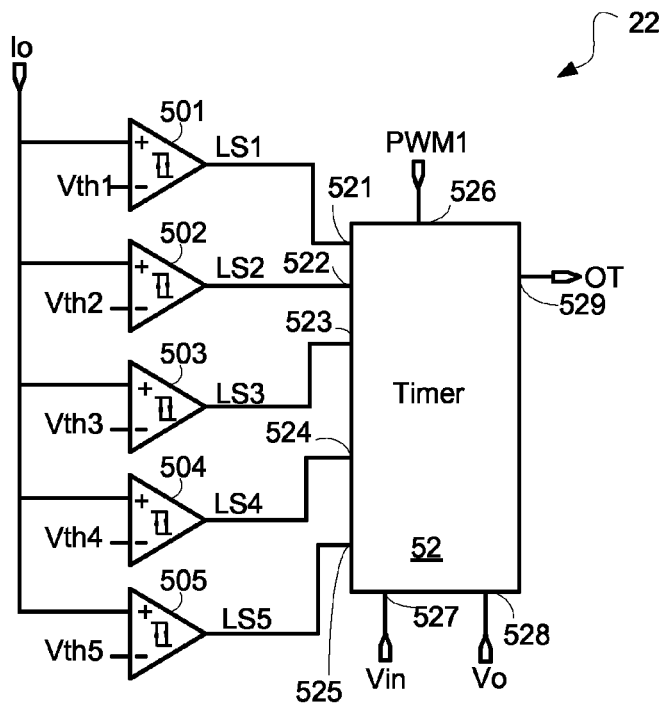
FIG. 5 shows an on-time generator according to an embodiment of the present invention.

FIG. 5 shows an on-time generator 22 according to an embodiment of the present invention. On-time generator 22 generates an on time signal OT at an output end 529 to control the on time period in a COT converter based on an output current feedback signal Io. On time signal OT may be generated further based on the input voltage Vin and output voltage Vout. On-time generator 22 comprises a plurality of comparing circuits 501-505 and a timer 52. Each comparator, for example comparator 501 compares the output current feedback signal Io with a reference signal Vth1, and outputs a load indication signal LS1. Though Io is presented in a current signal form, signal Io may be a voltage signal which increases with increasing output current. Or a current-voltage converter may be adopted to convert a current signal Io into a voltage signal and the voltage signal is supplied to comparators 501-505. Reference signals Vth1-Vth5 increases step by step. In the shown embodiment, each of comparators 501-505 is a hysteretic comparator to avoid the output from frequently oscillating between HIGH level and Low level during critical condition. However, in other embodiments, comparators of on-time generator are not hysteretic comparators and the digital timer functions to make sure the time signal OT is not affected by the frequent oscillation. Timer 52 comprises input ends 521-525 coupled to the output ends of comparators 501-505 to receive the load indicating signals LS1-LS5. The status of load indication signals indicate which level the load is in. In the shown embodiment, timer 52 further comprises a second input end 527 coupled to an input voltage Vin of a SMPS and a third input end 528 coupled to the voltage feedback signal Vo. At the output end 529 of the on-time generator 22, on time signal OT is generated according to the load indication signals LS1-LS5, signal PWM1, Vin and Vo. Signal OT indicates a time period for COT control. The time period starts to count once signal PWM1 is HIGH and signal OT is turned LOW. At the end of the time period, on time signal OT is triggered into logic HIGH to reset signal PWM1. The time period is decided by timer 52 according to the load indication signals LIS1-LIS5 outputted by comparators 501-505, the input voltage Vin and the output voltage Vo. In another embodiment, the time period is adjusted only according to the load indication signals LIS1-LIS5.

Figure 7:
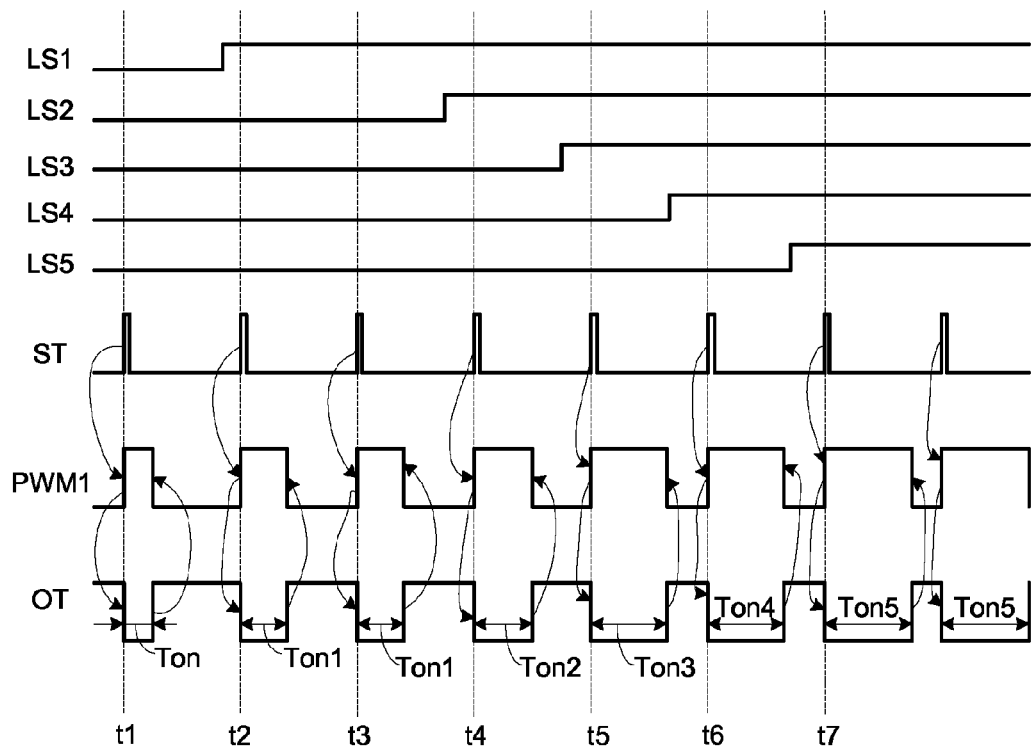
FIG. 7 illustrates some signals in the SMPS in FIG. 2 and the on-time generator in FIG. 5 according to an embodiment of the present invention.

FIG. 7 shows load indication signals LS1-LS5, signal PWM1 and on time signal OT to illustrate the function of on-time generator 22 with reference to SMPS 200 in FIG. 2, according to an embodiment of the present invention. Signal OT is reset into logic LOW once signal PWM1 is logic HIGH. And after a time period, OT is triggered HIGH by timer 52. When load increases above a first level relating to reference Vth1, load signal ST turns to logic HIGH. The higher the load is, more load signals among LS1-LS5 are in active state, and the time signal OT has longer time period. A load indication signal is in active state when the current feedback signal is higher than the corresponding reference signal. In the shown embodiment, active state is in logic HIGH. To be specific, at time t1, load is low and no load signal is in logic HIGH. When the output voltage decreases to a reference voltage, signal ST turns HIGH, and signal PWM1 is triggered to logic HIGH to turn on switch 21. At the meantime, the HIGH leveled PWM1 triggers signal OT to logic LOW. According to the load level indicated by low leveled load signals LS1-LS5, signal OT presents a time period of Ton indicated by LOW leveled OT.

At the end of Ton, signal OT turns to logic HIGH and resets PWM1 to logic LOW to turn off switch 21. At time t2, ST is set high again, PWM1 is triggered to logic HIGH and signal OT is reset into logic LOW. At this time, load increases and signal LS1 is in logic HIGH, accordingly, timer 52 set a time period Ton1 for COT control according to the load level indicated by HIGH leveled LS1, where Ton1 is longer than Ton. At the end of time period Ton1, signal OT is set HIGH to reset PWM1 to logic LOW. Load continues to increase and at time t4, load signals LS1 and LS2 are in logic HIGH. Accordingly, a time period Ton2 is decided by timer 52, where Ton2 is longer than Ton1. At time t5, signals LS1-LS3 are in logic HIGH. At time t6, signals LS1-LS4 are in logic HIGH. And at time t7, signals LS1-LS5 are in logic HIGH. Accordingly, the time periods for COT control have relationship of Ton5>Ton4>Ton3>Ton2. In one embodiment, the reference signals Vth1-Vth5 increase in arithmetic progression, and the time periods Ton-Ton5 also increase in arithmetic progression, which can be described as:

$$Vth2-Vth1=Vth3-Vth2=Vth4-Vth3=Vth5-Vth4, \text{ and}$$

$$Ton1-Ton=Ton2-Ton1=Ton3-Ton2=Ton4-Ton3=Ton5-Ton4.$$

Though the COT control as described above relates to the on time period of a PWM signal, in other embodiments, similar control towards off time period for off time control is also in the spirit of the present invention as confined by the attached claims.

Figure 8:
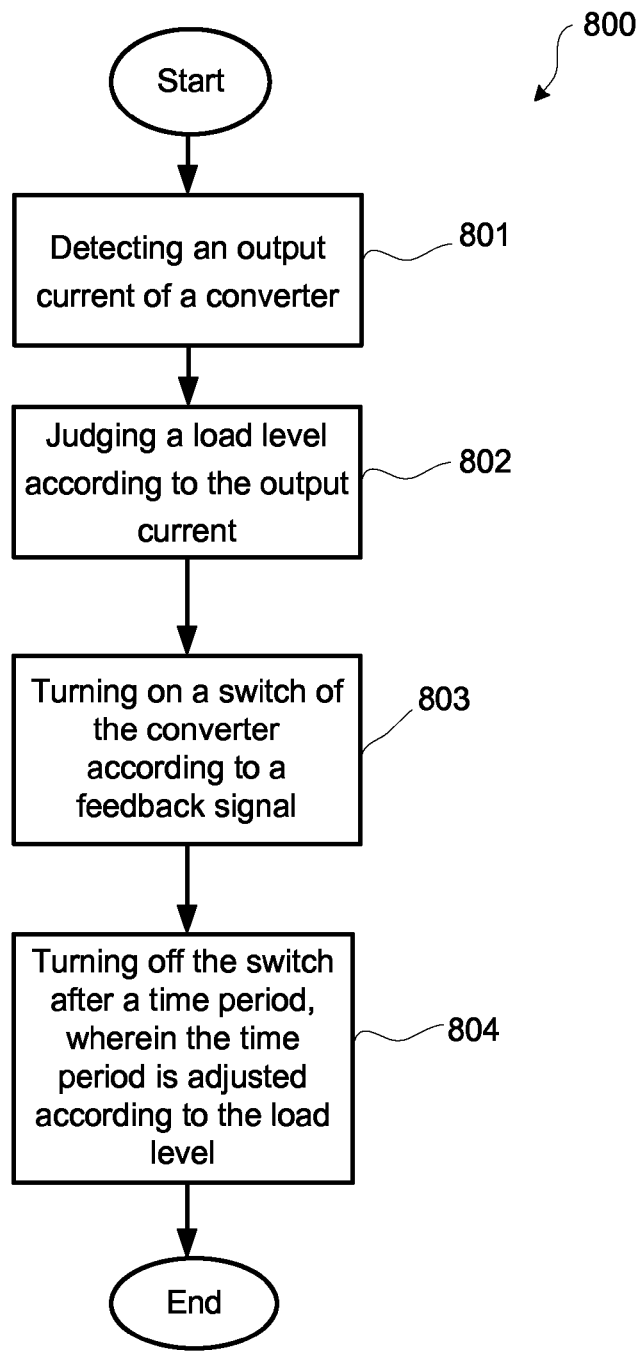
FIG. 8 illustrates a flow chart of a method according to an embodiment of the present invention.

FIG. 8 illustrates a flow chart of a method 800 according to an embodiment of the present invention. Method 800 aims to control the switching frequency of a COT converter in a predetermined range. The method 800 comprises in step 801 detecting the output current of a converter. In one embodiment, detecting the output current comprises getting a current feedback signal which indicates a current flowing through a load that is supplied by the converter.

In step 802, the method comprises judging a load level of the converter according to the detected output current. In one embodiment, the output current is scaled into multiple levels, and each level corresponds to a particular time period. Each level is defined between two output current values. And the load is matched with one of the multiple levels. In other words, if the load is in a particular level, the on time period for COT control is the time period corresponding to this level. A level having higher output current corresponds to a longer time period. In one embodiment, judging the load level comprises comparing the current feedback signal with a plurality of threshold signals and judging the load level according to the plurality of comparison results. In one embodiment, the number of threshold signals which are lower than the current feedback signal increases, the time period indicated by the time signal increases.

Method 800 further comprises in step 803 turning on a switch of the converter according to a feedback signal. In one embodiment, the switch is turned on when the output voltage is lower than a threshold voltage.

And in step 804, method 800 further comprises turning off the switch after a time period. Wherein the time period is adjusted according to the load level of the converter as described above, and wherein a higher load level corresponds to a longer time period. In this way, the switching frequency of the COT converter can be limited in a predetermined range by properly setting the threshold signals which is used for comparing with the current feedback signal.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

We claim:

1. A switching mode power supply (SMPS) configured to supply a load, the SMPS comprising:
   a switch, having a control end;
   an output port, configured to provide an output voltage, wherein the output voltage is regulated under the switching action of the switch, wherein the output port is coupled to the load, and wherein the output port is further configured to provide a voltage feedback signal indicating the output voltage and a current feedback signal indicating an output current of the load;
   an on-time generator, having an input end and an output end, wherein the input end is configured to receive the current feedback signal, and wherein the output end is configured to provide a time signal indicating an on time period; and
   a pulse width modulation (PWM) generator, having a first input end, a second input end and a first output end, wherein the first input end is configured to receive the voltage feedback signal, the second input end is configured to receive the time signal, and the output end is configured to provide a PWM signal that is coupled to the control end of the switch, and further wherein the PWM signal is configured to turn ON the switch when the voltage feedback signal is lower than a threshold voltage, and the PWM signal is configured to turn OFF the switch at an end of the on time period;
   wherein the output current is scaled into multiple levels, and wherein each of the multiple levels corresponds to a respective on time period, and further wherein the on time period increases when the output current increases; and
   wherein the on-time generator comprises:
   a plurality of comparing circuits, each of the plurality of comparing circuits is configured to compare the current feedback signal with a respective reference signal, and each of the plurality of comparing circuits is further configured to output a respective load indication signal; and
   a timer, having a plurality of input ends and an output end, wherein each of the plurality of input ends is configured to receive the respective load indication signal and the PWM signal, and wherein the output end is configured to provide the time signal based on the load indication signals and the PWM signal.

2. The SMPS of claim 1, wherein the time signal is configured to be turned LOW when the PWM signal turns HIGH, and the time signal is configured to be turned HIGH after the on time period indicated by the time signal, and further wherein the on time period is adjusted based on the load indication signals.

3. The SMPS of claim 1, wherein when the number of load indication signals in active state increases, the on time period indicated by the time signal increases, and further wherein a load indication signal is in active state when the current feedback signal is higher than the corresponding reference signal.

4. The SMPS of claim 1, wherein the reference signals are in arithmetic progression, and further wherein the corresponding on time periods are in arithmetic progression.

5. The SMPS of claim 1, wherein the timer further comprises:
   a second input end coupled to an input voltage of the SMPS; and
   a third input end coupled to the voltage feedback signal.

6. The SMPS of claim 1 comprises a buck converter, and wherein the switch is a high side switch.

7. The SMPS of claim 1, wherein the switch comprises an NMOSFET.

8. The SMPS of claim 1, wherein the PWM generator comprises:
   a comparator, having an inverting input end, a non-inverting input end and an output end, wherein the inverting input end is coupled to the voltage feedback signal, the non-inverting input end is coupled to a reference voltage, and the output end is configured to provide a comparison signal; and
   a flip-flop, having a set input end, a reset input end and a first output end, wherein the set input end is configured to receive the comparison signal, the reset input end is configured to receive the time signal, and the first output end is configured to provide the PWM signal.

9. The SMPS of claim 8, further comprising a synchronous rectifier coupled between the switch and a reference ground, wherein the flip-flop further comprises a second output end, and wherein the second output end is coupled to a control end of the synchronous rectifier.

10. The SMPS of claim 1, wherein the on time period is adjusted according to the current feedback signal, and wherein the frequency of the PWM signal is adjusted within a predetermined range.

11. A control circuit, comprising:
    an on-time generator, having an input end and an output end, wherein the input end is coupled to an output current feedback signal of a converter, and wherein the output end is configured to provide a time signal indicating an on time period for constant-on-time control, and further wherein the on time period is adjusted based on the output current feedback signal; and
    a PWM generator, having a first input end, a second input end and a first output end, wherein the first input end is coupled to an output voltage of the converter, the second input end is configured to receive the time signal, and the output end is configured to provide a PWM signal, and wherein the PWM signal is set HIGH when the output voltage is lower than a threshold voltage, and the PWM signal is reset LOW at an end of the on time period, and wherein the output current is scaled into multiple levels, and each of the multiple levels corresponds to a respective on time period, and further wherein the on time period increases when the output current increases;
    wherein the on-time generator comprises:
    a plurality of comparing circuits, each of the plurality of comparing circuits is configured to compare the current feedback signal to a respective reference signal and output a respective load indication signal; and
    a timer, having a plurality of input ends and an output end, wherein each of the plurality of input ends is configured to receive the respective load indication signal and the PWM signal, and wherein the output end of the timer is configured to provide the time signal.

12. The control circuit of claim 11, wherein the PWM generator comprises:
    a comparator, having an inverting input end, a non-inverting input end and an output end, wherein the inverting input end is coupled to the output voltage, the non-inverting input end is coupled to the threshold voltage, and the output end is configured to provide a comparison signal; and a flip-flop, having a set input end, a reset input end and a first output end, wherein the set input end is coupled to the output end of the comparator to receive the comparison signal, the reset input end is coupled to the output end of the on-time generator to receive the time signal, and the first output end is configured to provide the PWM signal.

13. The control circuit of claim 11, wherein the time signal is configured to be turned LOW when the PWM signal turns HIGH, and the time signal is configured to be turned HIGH after the time period indicated by the time signal, and wherein the on time period is adjusted according to the load indication signals.

* * * * *